3,682,888
Patented Aug. 8, 1972

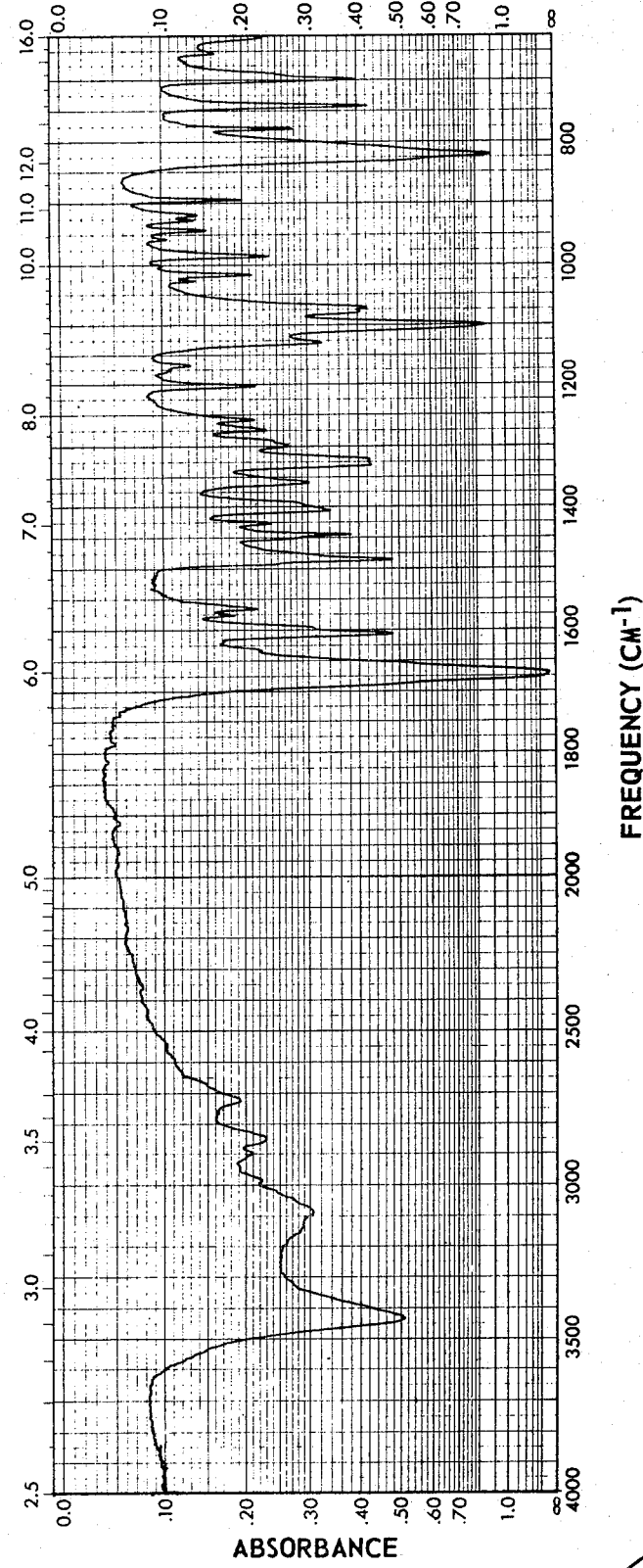

3,682,888
REACTION PRODUCT OF 7-CHLORO-1-METHYL-5-PHENYL - 1,4 - 3H - BENZODIAZEPIN-2(1H)-ONE WITH CHLORAL HYDRATE AND PROCESS
Ctirad Podesva, 3333 Maplewood Ave., and Kitty Vagi, 434 Grosvenor, both of Montreal 6, Quebec, Canada
Continuation of application Ser. No. 864,239, July 24, 1969. This application Oct. 20, 1970, Ser. No. 82,497
Int. Cl. C07d 53/06
U.S. Cl. 260—239.3                                                                 10 Claims

ABSTRACT OF THE DISCLOSURE

A new substance having pharmaceutical activity is prepared by reacting chloral hydrate and 7-chloro-1-methyl-5-phenyl-1,4-3H-benzodiazepin-2(1H)-one. The molecular formula of the new substance, which has a M.P. of about 110° C., is $C_{18}H_{16}Cl_4N_2O_3$. I.R. spectrum (see drawing) shows absorption bands among others at about 3430, and 1670 cm.$^{-1}$. This compound exhibits tranquilizing, anti-convulsive and muscle relaxant properties.

This application is a continuation of application Ser. No. 620,799, filed Mar. 6, 1967, now abandoned.

STATUS OF PRIOR APPLICATIONS

This application is a continuation of Application Ser. No. 864,239, filed July 24, 1969 which in turn is a continuation of application Ser. No. 620,799, filed Mar. 6, 1967. Both prior applications are now abandoned.

BACKGROUND OF THE INVENTION

This invention relates to a new substance and to a process for its preparation. More specifically, this invention relates to 7-chloro-1-methyl-5-phenyl-1,4-3H-benzodiazepin-2(1H)-one chloral hydrate and to a process for its preparation.

SUMMARY OF THE INVENTION

An object of the invention is to provide a new and useful substance. Another object is to provide a method for the preparation of said substance.

The product of the present invention is represented by the general formula: $C_{18}H_{16}Cl_4N_2O_3$ and has a melting point of about 110° C. It shows especially characteristic infra-red absorption bands at about 1670 cm.$^{-1}$ and at about 3430 cm.$^{-1}$. The complete infra-red spectrum, taken in potassium bromide is shown in the single figure of drawings.

The compound of this invention displays valuable pharmacological properties. In particular, it exhibits tranquilizing, anti-convulsive and muscle relaxant properties.

When tested on mice, the effect on the central nervous system of the product of the present invention was found both qualitatively and quantitatively different from that of 7-chloro-1-methyl-5-phenyl - 1,4 - 3H - benzodiazepin - 2 (1H)-one and from that of the physical mixtures of the latter with chloral hydrate in 1:1 and 1:2 molar proportions. The compound of the present invention was found to be a potent muscle relaxant as shown in Table I and also an anticonvulsant (against strychnine induced convulsions) as shown in Table II. In both tables the product of the present invention is represented by A, whereas B represents 7-chloro-1-methyl-5-phenyl-1,4-3H-benzodiazepin-2(1H)-one, C represents chloral hydrate, D represents an equimolecular mechanical mixture of B and C and E represents a mechanical mixture of B and C in 1:2 molecular ratio.

TABLE 1.—MUSCLE RELAXANT DOSE OF VARIOUS COMPOUNDS IN THE MOUSE (PER OS)

| Compounds | No. of mice | ED$_{50}$, mg./kg. | Range [1] | P-value against A | Potency of A against |
|---|---|---|---|---|---|
| A | 50 | 5.4 | 3.27–8.91 | | |
| B | 40 | 14.0 | 10.77–18.20 | <0.05 | 2.6(1.5–4.55) |
| C | 74 | 270.0 | 142.1–513 | <0.05 | 50.0(22.5–112.5) |
| D | 40 | 11.5 | 6.4–20.7 | N.S. | 2.13(0.99–4.5) |
| E | 40 | 24.0 | 15.0–38.4 | <0.05 | 4.44(2.24–8.79) |

[1] Range for 19/20 confidence limit.

NOTE.—N.S.=not significant at 19/20 confidence limit.

TABLE 2.—PROTECTIVE DOSE (PD$_{50}$) AGAINST STRYCHNINE (I.V.) MORTALITY OF VARIOUS COMPOUNDS IN THE MOUSE (PER OS)

| Compounds | No. of mice | ED$_{50}$, mg./kg. | Range [1] | P-value against A | Potency of A against |
|---|---|---|---|---|---|
| A | 50 | 5.5 | 3.24–9.35 | | |
| B | 40 | 13.0 | 9.0–18.9 | <0.05 | 1.63(1.24–4.48) |
| C | 24 | Even at ED$_{72}$ (500 mg./kg.)—no protection (100% mortality) | | | |
| D | 40 | 14.5 | 9.4–22.48 | <0.05 | 2.64(1.3–5.23) |
| E | 40 | 10.5 | 6.77–16.28 | N.S. | 1.9(0.96–3.76) |

[1] Range for 19/20 confidence limit.

NOTE.—N.S.=not significant at 19/20 confidence limit.

As can be clearly seen from the above description the pharmacological activity of the product of the present invention is qualitatively and quantitatively different from the activities of either of the starting materials and their mechanical mixtures. These high activities could not be foreseen from the activities of the components and the results obtained on testing are unexpected and surprising.

Equally surprising is the easy formation of the product of this invention, especially in view of the fact that benzodiazepinones not substituted in position 1 or substituded with substituents such as a phenyl group in position 3 do not react with chloral hydrate under the conditions used for the preparation of our new product.

The compound of this invention may be prepared for administration by formulation with the usual pharmaceutical carriers, for oral administration.

For example, an amount of the product of the invention ranging from about 2 milligrams to about 200 milligrams, individually selected according to the condition to be treated, may be formulated into dosage units with any of the usual pharmaceutical carriers, as, for example, lactose, starch, gelatin, etc.

The product of the invention is readily obtained in excellent yields by reacting together 7-chloro-1-methyl-5-phenyl-1,4-3H-benzodiazepin-2(1H)-one and chloral hydrate. Best results are obtained by bringing the reactants together in approximately equimolar quantities. It is preferred to bring the reaction about by heating e.g. above room temperature but, if a solvent is used, the reaction will take place even at room temperature. A mere mechanical mixture of the two reactants in the absence of a solvent will not yield the desired product at room temperature. The reaction is preferably carried out in a medium of a substantially non-polar organic solvent, e.g. benzene, toluene, xylene, or hexane. However, the product of the invention is also obtained when the two reactants are melted together in the absence of a solvent.

The nature of the bond obtained in the reaction is not clear. Possibly, the strong partial positive charge of the carbon atom which is substituted by three chlorine atoms in chloral hydrate is partially compensated by the partial negative chage of the amino nitrogen of the other reactant. Another hypothesis is that the imino dipole is discharged by addition of a hydroxyl group from the chloral hydrate. However, the present invention is not restricted to any theoretical interpretation of the reaction.

DESCRIPTION OF PREFERRED EMBODIMENTS

In order that the nature of the present invention be more fully understood, the following examples are given for illustration, but they should not be construed as limiting the scope of the invention.

Example 1

To a stirred solution of 6.8 g. of chloral hydrate in 12 ml. of benzene at a temperature of about 40° C. were added 10 g. of 7-chloro-1-methyl-5-phenyl-1,4-3H-benzodiazepin-2(1H)-one. The latter compound went immediately into solution and the reaction product precipitated from the reaction mixture in a short time. It was collected by filtration, washed with benzene and dried at room temperature. The yield was about 15 g. An analytical sample was prepared by recrystallization from benzene and had a melting point of about 110° C.

Analysis.—Calculated for $C_{18}H_{16}Cl_4N_2O_3$ (percent): C, 48.02; H, 3.58; Cl, 31.51; N, 6.22. Found (percent): C, 48.01; H, 3.77; Cl, 31.52; N, 6.10.

Example 2

The process was carried out as described in Example 1, except that toluene was used instead of benzene as solvent. The same product as in Example 1 was obtained in the amount of 13.2 g.

Example 3

Using xylene instead of benzene as reaction medium, the otherwise same process as described in Example 1 was carried out. The same product as in Example 1 was obtained. The yield was 13 g.

Example 4

To a boiling solution of 6.8 g. of chloral hydrate in 100 ml. of hexane were added 10 g. of 7-chloro-1-methyl-5-phenyl-1,4-3H-benzodiazepin-2(1H)-one. The latter starting material dissolved immediately and the reaction product precipitated on cooling. The yield was 14.1 g. and the product was found identical with that described in Example 1.

Example 5

An intimate mixture of 1.4 g. of chloral hydrate and 2 g. of 7-chloro-1-methyl-5-phenyl-1,4-3H-benzodiazepin-2(1H)-one was heated to 100° C. and kept at that temperature for 10 minutes. After cooling, the product was triturated with benzene and collected by filtration. The yield was 2.25 g. and the prouct was found identical with the one described in Example 1.

Example 6

To a stirred solution of 6.8 g. of chloral hydrate in 15 ml. benzene. 10 g. of 7-chloro-1-methyl-5-phenyl-1,4-3H-benzodiazepin-2(1H)-one were added at room temperature. The latter compound went immediately into solution and the reaction product precipitated from the reaction mixture in a short time. It was collected by filtration, washed with benzene and dried at room temperature. The yield was 14.3 g. and the product was found identical with that described in Example 1.

We claim:

1. A process for the production of a chemical substance having a molecular formula of $C_{18}H_{16}Cl_4N_2O_3$, and being further characterized by a melting point of about 110° C. and by infra-red absorption bands at about 3430 and 1670 cm.$^{-1}$, which comprises reacting 7-chloro-1-methyl-5-phenyl-1,4-3H-benzodiazepin-2(1H)-one and chloral hydrate.

2. A process according to claim 1, wherein the reactants are kept in contact at a tempertaure higher than room temperature in the absence of a solvent.

3. A process according to claim 1, wherein the reactants are brought together in a medium of a substantially non-polar organic solvent.

4. A process according to claim 3, wherein the solvent is benzene.

5. A process according to claim 3, wherein the solvent is toluene.

6. A process according to claim 3, wherein the solvent is xylene.

7. A process according to claim 3, wherein the solvent is n-hexane.

8. A process according to claim 3, wherein the reaction is carried out at a temperature higher than room temperature.

9. A chemical substance having a molecular formula of $C_{18}H_{16}Cl_4N_2O_3$, having a melting point of about 110° C. and having an infra-red absorption spectrum in potassium bromide in solid form substantially as shown in the single figure of drawings.

10. A chemical substance having a molecular formula of $C_{18}H_{16}Cl_4N_2O_3$, further characterized by a melting point of about 110° C. and by infra-red absorption bands at about 3430 cm.$^{-1}$ and 1670 cm.$^{-1}$, said chemical substance being identifiable as the same substance resulting from reaction between 7-chloro-1-methyl-5-phenyl-1,4-3H-benzodiazepin-2(1H)-one and chloral hydrate.

References Cited

UNITED STATES PATENTS 3,371,085    2/1968    Reeder et al. _____ 260—239.3 D

HENRY R. JILES, Primary Examiner

R. J. BOND, Assistant Examiner

U.S. Cl. X.R.

424—244